Sept. 10, 1935.                    W. H. BAUCH                    2,014,099
                                PROJECTOR FILM GATE
                                Filed Aug. 23, 1933

Inventor,
William H. Bauch,
By
Minturn & Minturn,
Attorneys.

Patented Sept. 10, 1935

2,014,099

UNITED STATES PATENT OFFICE 2,014,099

PROJECTOR FILM GATE

William H. Bauch, Shelbyville, Ind., assignor to Pembroke W. Cornelius, Indianapolis, Ind., doing business under the name and style of Cornelius Engineering Company Application August 23, 1933, Serial No. 686,418

3 Claims. (Cl. 88—17)

This invention relates to the art of motion picture projectors and particularly to a film gate through which the film is passed. A primary object of the invention is to provide a simplified gate that may be incorporated within a very small space whereby the gate may be employed in a portable projector and the projector itself may thereby be reduced in size. A further important object of the invention is to provide a gate giving a wide opening free from obstructions at the top, bottom or side, so that the film may be easily and quickly threaded through the gate. An important advantage of the gate is that it may be operated readily without danger of damaging the film and further that the mere partial rotation of a member completely releases or engages the film.

Figure 1:
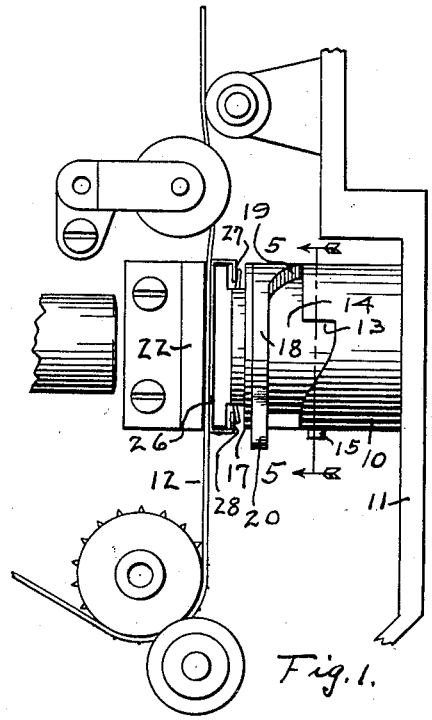
Figure 2:
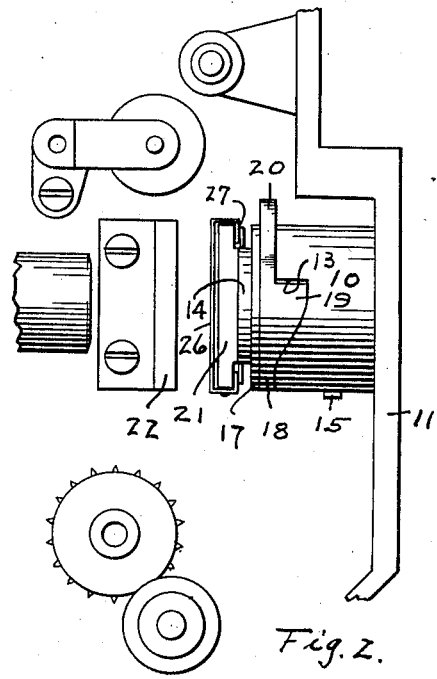
Figure 3:
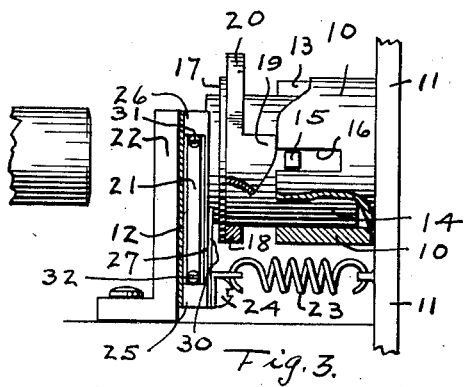
Figure 4:
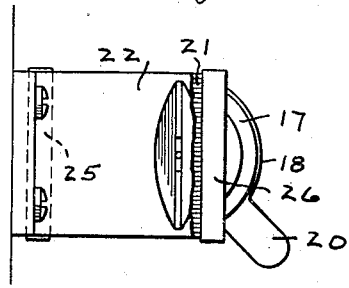

These and other objects and advantages of the invention will become apparent to those skilled in the art in the following description of one particular form of the invention as illustrated by the accompanying drawing, in which Fig. 1 is a side elevation of a structure embodying my invention with a film in position and the gate closed;

Fig. 2, a side elevation with the gate open and the film removed;

Fig. 3, a fragmentary bottom plan view with parts broken away;

Fig. 4, a rear elevation with parts broken away; and

Figure 5:
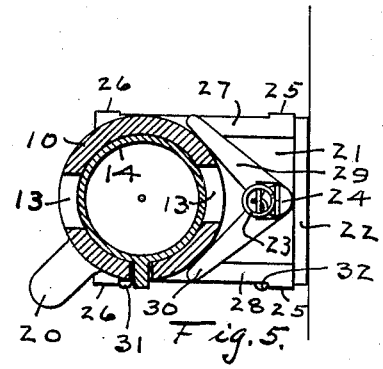

Fig. 5, a vertical section on the line 5—5 in Fig. 1.

Like characters of reference indicate like parts throughout the several views in the drawing.

The invention is herein shown as being applied to a gate through which the film is passed to be subjected to a beam of light from an exciter lamp as a part of the sound reproducing system of the projector, but the application is not limited thereto.

The cylinder 10 which is affixed to the projector frame 11, and through which the light beam is passed upon leaving the film 12, is provided on its rear end with a plurality of cam-like notches 13, here shown as two in number. Within the cylinder 10 is telescoped a hollow cyinder 14 which is provided with a lug 15 slidably engaging in the slot 16 cut longitudinally back in the cylinder 10 from its rear end, this lug 15 serving as means for preventing rotation of the cylinder 14.

An annular flange 17 is carried by the cylinder 14, and between this flange 17 and the rear end of the cylinder 10 is positioned a collar 18 to be free to revolve on the cylinder 14. This collar 18 is provided with teeth 19, one for each notch 13. The teeth 19 and notches 13 are correspondingly shaped to cooperate, whereby, upon revolving the collar 18, these teeth may drop into the notches 13 and be raised therefrom by sliding in and out over sloping edges of the notches. An operating ear 20 extends from the collar 18.

On the rear end of the cylinder 14, is a head 21 which is primarily a vertically disposed plate maintained in parallel alignment with the fixed aperture plate 22. A spring 23 is engaged by one end to the head 21 by the screw 24 and to the frame 11 by its other end, so that the head, and consequently the cylinder 14 is urged forwardly. The degree of forward travel of the head 21 to be produced by the spring 23 is limited by the axially revolved position of the collar 18. By turning the collar 18 to let the teeth 19 drop into the notches 13, the head 21 is then shifted forwardly by the spring 23 to leave a corresponding gap between it and the plate 22, as in Fig. 2.

In order that the film 12 may be yieldingly gripped between the fixed plate 22 and the shiftable head 21, I provide vertically disposed presser bars 25 and 26, one along each vertical edge of the head 21 to be yieldingly urged rearwardly. These bars 25 and 26 are bent over the top and bottom ends of the head plate 21 to unite with the upper and lower ties 27 and 28 respectively positioned back of the head plate, the horizontal distance between the bars 25, 26 and ties 27, 28 exceeding that of the thickness of the head plate. Leaf springs 29, 30, fixed to the head 21 by the screw 24 compressively bear against the ties 27, 28 urging them rearwardly. Screws 31, 32 in the bottom edge of the plate 21 contact with the inner edges of the bars 25, 26 where they bend across that edge and thereby serve to position the bars and retain them against shifting across the face of the head 21. Thus, the bars 25, 26 normally extend rearwardly from the face of the head 21 and, being properly spaced apart, bear yieldingly against the edges of the film 12 when the head 21 is carried rearwardly by the collar 18. When the teeth 19 of the collar 18 bear against the outer end of the cylinder 14 spaced circumferentially away from the notches 13, the head 21 is retained in its rearmost position and can not be shifted forwardly until the collar 18 is turned to bring the teeth 19 into the notches 13.

While I have herein shown and described my invention in one particular form, it is obvious that structural variations may be employed without departing from the spirit of the invention, and I therefore do not desire to be limited to that precise form beyond the limitations that may be imposed by the following claims.

I claim:

1. In a film gate for a motion picture projector having a member through which a light beam is directed and an aperture plate therebehind, a shiftable member telescoping with the first member, a collar revolubly mounted on the shiftable member, a head on the shiftable member directed toward the aperture plate, a pair of pressure bars, one along each vertical edge of the head and means to urge them rearwardly to yieldingly grip the film, spring means normally urging the shiftable member forwardly away from said plate, and cam means between the first member and the shiftable member actuated by said collar for shifting said head toward said plate.

2. In a film gate for a motion picture projector having a member through which a light beam is directed and an aperture plate therebehind, a frame, a shiftable member telescoping with the first member, a collar revolubly mounted on the shiftable member, a head on the shiftable member directed toward the aperture plate, a pair of pressure bars one along each vertical edge of the head, ties back of the head with which the pressure bars are united, a pair of springs fixed to the head and compressively bearing against the ties, a spring attached at one end to the head and at the other end to the frame, normally urging the shiftable member forwardly away from said plate, and cam means between the first member and the shiftable member actuated by said collar for shifting said head toward said plate, said cam means comprising at least one tooth extending forwardly from said collar to abut said first member and a notch in the first member within which the tooth may extend to permit forward travel of said shiftable member.

3. In a film gate for a motion picture projector having a member through which a light beam is directed and an aperture plate therebehind, a shiftable member telescoping with the first member, a collar revolubly mounted on the shiftable member, a head on the shiftable member directed toward the aperture plate, a pair of pressure bars one along each vertical edge of the head having their ends carried across the head, ties back of the head to which the bars are connected, spring means normally urging the shiftable member forwardly away from said plate, and cam means between the first member and the shiftable member actuated by said collar for shifting said head toward said plate, yieldably retracting means carried by said head and compressively bearing against the ties and filling in the space between the head and a film on said aperture plate when the head is shifted theretoward.

WILLIAM H. BAUCH.